Sept. 22, 1970 D. L. WOOD 3,530,284

SHIFT COUNTER HAVING FALSE MODE SUPPRESSION

Filed March 25, 1968 2 Sheets-Sheet 1

INVENTOR.
DELLOS L. WOOD

BY S. C. Yeaton

ATTORNEY

SHIFT COUNTER HAVING FALSE MODE SUPPRESSION

Filed March 25, 1968 2 Sheets-Sheet 2

INVENTOR.
DELLOS L. WOOD
BY
S. C. Yeaton
ATTORNEY

United States Patent Office 3,530,284
Patented Sept. 22, 1970

3,530,284
SHIFT COUNTER HAVING FALSE MODE SUPPRESSION

Dellos L. Wood, Charlottesville, Va., assignor to Sperry Rand Corporation, a corporation of Delaware Filed Mar. 25, 1968, Ser. No. 715,746
Int. Cl. G06m 3/12; H03k 21/34
U.S. Cl. 235—153 9 Claims

ABSTRACT OF THE DISCLOSURE

A multi-stage shift register counter in which preferred and spurious modes may occur has auxiliary gating means coupled to three successive counter stages. The gating means is connected to produce a correction signal to the intermediate of these stages if the three stages happen to be switched to the ZERO-ONE-ZERO state.

BACKGROUND OF THE INVENTION

This invention relates to a digital counter and more specifically to a shift register counter.

Shift register counters represent popular types of digital counters. They are widely used since they are considered the simplest type of non-binary counters known today.

Basically, shift register counters are N-stage shift registers with inverse feedback. That is, the shift register counter is a type of ring counter in which the complement of an output signal is fed back to the input of the counter.

These counters are considered non-binary in that although each stage stores binary information, the binary number stored in the entire counter at any time does not necessarily represent the total number of counts that have been applied to the counter.

In a given mode of operation, however, the binary state of a counter is a unique representation of the number of counts that have been fed into the counter. A given shift register counter operating in a preferred mode, for instance, may originally be set to the binary ZERO state. The first four input pulses would switch the counter stages of binary states representing decimal 1, 3, 6 and then 4 in that order. The fifth input pulse would return the counter to the ZERO state.

In practical applications, the equipment used with a particular shift counter can be designed to accept the code utilized in that counter directly, or a decoding matrix may be used to transform the output into a desired pattern.

Shift register counters are cyclical in that a certain number of counts will reset the counter to ZERO and a new counting cycle will begin. If a given counter is preset to ZERO, and ten succeeding input pulses switch the counter through each of its successive states so as to leave the counter in the ZERO state, this counter is said to have a "modulus of 10." The counter may be referred to as "modulo 10" counter.

Shift register counters are somewhat unreliable in that they can accidentally fall into a spurious operating mode. A modulo 10 counter, for instance, contains five flip-flop stages, having a total of 32 possible binary states. Only ten of these 32 possible states are used. A spurious transient or other abnormal condition may switch one or more counter stages into an unassigned state, however, so that the counter would then be forced into a different mode of operation and succeeding readings would be in error.

Consider for instance, a conventional modulo 6 shift register counter employing three J–K flip-flop stages. This combination of flip-flops has eight possible binary states.

However, only six of these states are to be used. The six desired states constitute a desired mode of operation. The two remaining states constitute a secondary or spurious mode of operation. This may be visualized by referring to the following tables showing the binary state of each counter stage as successive counting pulses are applied. The input, intermediate and output stages are referred to as stages A, B and C, respectively:

DESIRED MODE

| Count Number | Stage A | Stage B | Stage C | Decimal Value |
|---|---|---|---|---|
| 0 | 0 | 0 | 0 | 0 |
| 1 | 1 | 0 | 0 | 1 |
| 2 | 1 | 1 | 0 | 3 |
| 3 | 1 | 1 | 1 | 7 |
| 4 | 0 | 1 | 1 | 6 |
| 5 | 0 | 0 | 1 | 4 |
| 6 | 0 | 0 | 0 | 0 |

SPURIOUS MODE

| Count Number | Stage A | Stage B | Stage C | Decimal Value |
|---|---|---|---|---|
| 0 | 0 | 1 | 0 | 2 |
| 1 | 1 | 0 | 1 | 5 |
| 2 | 0 | 1 | 0 | 2 |
| 3 | 1 | 0 | 1 | 5 |
| 4 | 0 | 1 | 0 | 2 |
| 5 | 1 | 0 | 1 | 5 |
| 6 | 0 | 1 | 0 | 2 |

Thus, it can be seen if some disturbance accidentally switches a stage into one of the states peculiar to the spurious mode, the counter will thereafter merely alternate between the states in the spurious mode in response to subsequent counting pulses and the results obtained will be in error.

Although a specific low modulus counter has been selected for purposes of illustration, it can be shown that desired and spurious modes exist for shift register counters of all moduli of interest.

To complicate matters further, the higher moduli counters may have several spurious modes. A modulo 10 counter, for instance, has four possible modes of operation. Three of these modes have ten-bit cycles and the fourth has a two-bit cycle. In a given application, operation must be confined to just one of the ten-bit modes.

Although shift register counters having a wide variety of moduli are in use, many applications require counters having a modulus of 10 or less. The present invention is concerned with improvements to shift register counters in this category.

Although schemes have been formulated for detecting and correcting spurious modes in shift register counters, such schemes are limited to counters of a given modulus.

It is an object of the present invention to improve the reliability of shift register counters.

It is another object of the present invention to provide a variable modulus shift counter of high reliability.

SUMMARY OF THE INVENTION

These and other objects of the present invention are achieved by providing means to detect a particular combination of binary digits common to all spurious modes in a shift counter and further providing means to transfer the operation of the counter to a preferred mode when such a combination of binary digits is detected.

DESCRIPTION OF THE PREFERRED EMBODIMENTS

Figure 1:
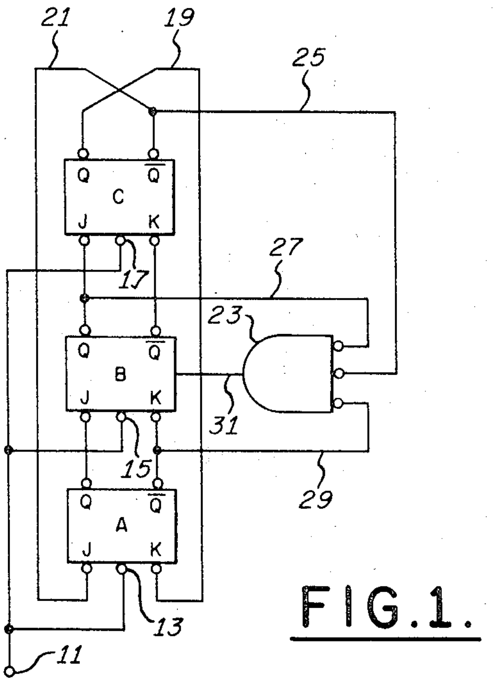
FIG. 1 is a block diagram of a modulo 6 shift register counter employing the principles of the invention.

Referring now to FIG. 1, a modulo 6 shift register counter employs an input stage A, an intermediate stage B and an output stage C.

As is customary in such counters, the information stored in such stages increases in significance from the input stage A to the output stage C.

As presently preferred, the circuit utilizes conventional J–K flip-flops as indicated in the various figures in which the standard symbols for this kind of flip-flop have been used. This type of flip-flop produces complementary output signals so that one or the other of the two output terminals provides a binary ONE output signal when the second output terminal provides a binary ZERO output signal. The binary state of the flip-flop is reversed by applying a clock pulse together with an input signal. A clock pulse applied to the terminal 11 of FIG. 1 appears at the clock terminals 13, 15 and 17. Any stage having a voltage applied to its J input terminal will thereafter produce a steady voltage at its Q output terminal. This may conveniently be considered a binary ONE output. Any stage having a voltage applied to its K input terminal will produce a steady voltage at its $\overline{Q}$ output terminal after the occurrence of a clock pulse. This may be considered a binary ZERO output signal.

It will be understood that various kinds of flip-flops may be used for these clocked shift register stages. Vacuum tube or transistor equivalents are well-known in the art, for instance. In general, however, a clocked shift register stage is one which produces a pair of complementary output signals and is switched by a clock pulse to a binary state in accordance with a steady voltage being applied to one of the input terminals.

As is conventional in shift register counters, output signals from stage C are cross-coupled back to the input terminal of stage A through feedback lines 19 and 21.

According to the principles of the invention, a mode suppression circuit contains a coincidence gate 23. A binary ZERO signal appearing at the $\overline{Q}$ terminal of stage C is applied to the gate 23 through the line 25. A binary ONE output signal from stage B is applied to the gate 23 through a line 27 and a binary ZERO signal from the stage A is applied to the gate 23 through a line 29. Any output signal from the gate 23 is applied to a preset terminal P of the stage B through a line 31. This serves to switch the stage B to the binary ZERO state.

The logic elements in the circuits illustrated in the various drawings have been shown as NAND type elements, however, it will be understood that the equivalent OR-AND logic elements may be used if desired.

A brief consideration of the manner in which signals propagate through conventional shift register counters will illustrate the concepts on which the present invention is based:

A clock pulse causes the input stage of such a counter to assume a binary state that is the complement of the binary stage occupied by the feedback stage prior to the occurrence of the pulse.

A clock pulse causes all stages other than the input stage to assume the same binary state as that occupied by the previous stage prior to the occurrence of the pulse.

This action may be visualized by imagining that a group of binary ONES "pushes" the preceding group of binary ZEROES out of the register and vice versa.

There can never be more than two such groups in the register at any time, although a "group" may consist of a single digit so long as the counter remains in the preferred mode of operation. Therefore, there can never be an isolated binary ONE in an intermediate stage so long as the counter remains in this preferred mode. Should a spurious mode be accidentally introduced, however, an isolated binary digit will necessarily occur.

The operation of the invention may be understood by again referring to FIG. 1 as well as the desired and spurious mode tables shown previously.

Before operation is to begin, all stages are set to the binary ZERO state. The first clock pulse switches stage A to the binary ONE state. The second clock pulse switches stage B to the binary ONE state and leaves the stage A in the binary ONE state. The third pulse switches stage C to the binary ONE state thus leaving all stages in the binary ONE state. Succeeding clock pulses then switch the individual stages to the binary ZERO state until all stages are returned to the binary ZERO state by the sixth clock pulse.

By referring back to the desired mode table, it will be noticed that in this mode the binary pattern ZERO-ONE-ZERO never occurs.

It will be noticed, however, that in the spurious mode, the binary ZERO-ONE-ZERO condition will occur after the application of every second clock pulse. When this spurious condition occurs, the gate 23 of FIG. 1 receives an input signal at each of its input terminals and thus produces a preset signal on the line 31. This switches the stage B to the binary ZERO state and forces the counter back into the desired mode of operation.

Figure 2:
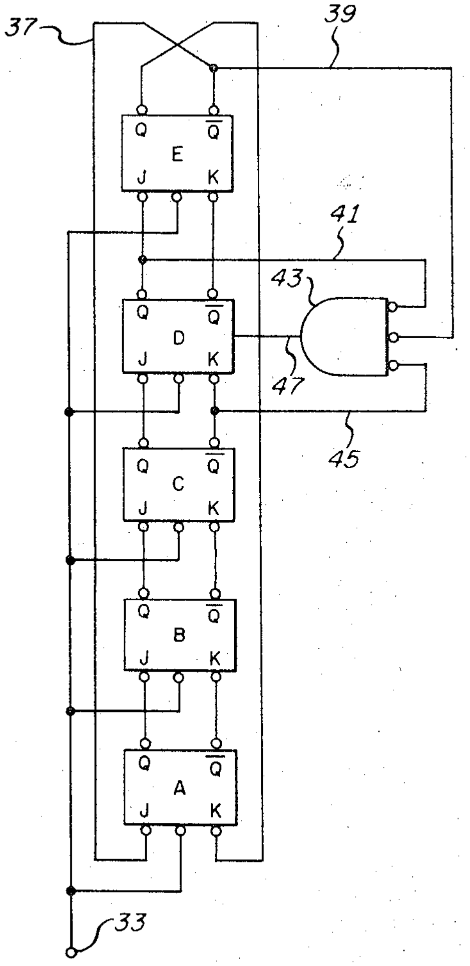
FIG. 2 is a block diagram of a modulo 10 shift register counter employing the principles of the invention.

The principles of operation of the modulo 6 counter can be expanded by increasing the number of counter stages to any desired value. Thus, the modulo 10 counter shown in FIG. 2 contains two extra stages. The mode suppression circuit is still coupled to the three most significant stages in this counter. An output line 39 from the binary ZERO output stage E and a line 41 from the binary ONE terminal of stage D are applied to the suppression gate 43. A line 45 is also applied to the gate 43 so as to detect the binary ZERO condition in the stage C. When the three input signals are applied to the gate 43, a preset signal appears on the line 47 so as to switch the gate D to the binary ZERO state.

As discussed previously, the desired mode of operation of such a modulo 10 counter does not contain any binary condition in which the three most significant stages C, D and E are switched to the binary condition ZERO-ONE-ZERO. Any spurious mode occurring in such a counter, however, will include a condition in which the three most significant stages are switched to the binary ZERO-ONE-ZERO condition.

Figure 3:
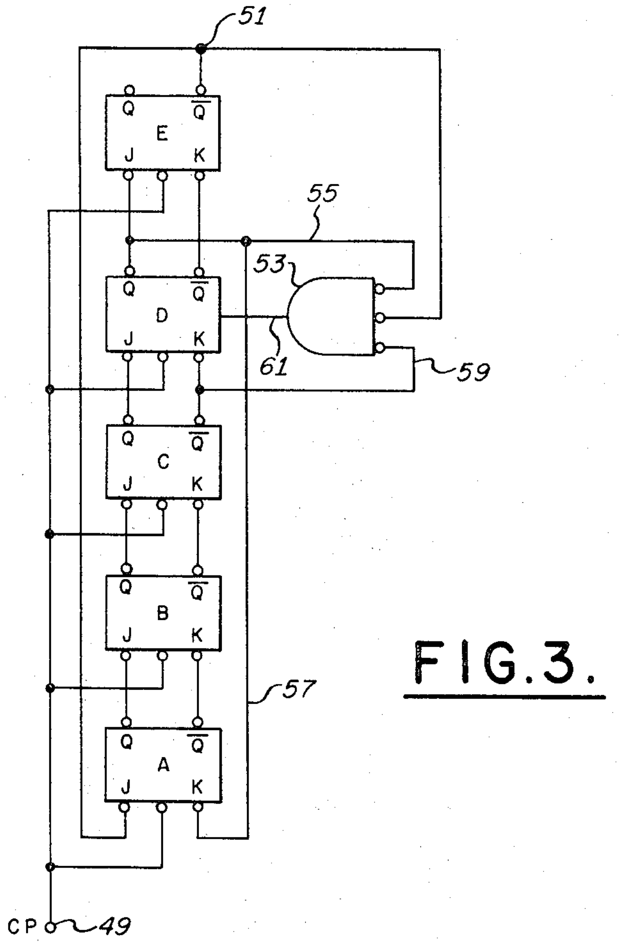
FIG. 3 is a block diagram of a modulo 9 shift register counter employing the principles of the invention.

As is known in shift register counters of this type, odd modulo counters require a feedback network in which the binary ZERO output signal from the most significant stage is fed back to the input stage but the binary ONE output is derived from the second most significant stage. This is illustrated in FIG. 3 in which the output line 51 is applied to the suppression gate 53 and to the input terminal J of the input stage A. The binary ONE feedback signal is derived from the second most significant stage D and applied to the K input terminal of the stage A as well as the suppression gate 53 through the line 55. The third signal for the gate 53 is derived from the binary ZERO terminal of the counter stage C. This signal is applied to the gate 53 through the line 59. Simultaneous application of the three signals to the gate 53 produces an output signal on the line 61 which again serves to preset the second most significant stage to the binary ZERO state.

As is the case with the previously discussed counters, any spurious mode that can occur in the counter of FIG. 3 will include a binary condition in which the three most significant stages include the binary ZERO-ONE-ZERO condition. The desired mode, however, will never contain such a binary condition. Thus, the mode suppression circuit will detect such a binary condition and force the counter back into the desired mode of operation.

It can be shown further that any shift register counter having a modulus of 6 or of 8–11 inclusive, will contain a desired mode and one or more spurious modes of operation. Each of the spurious modes will include a binary condition in which the ZERO-ONE-ZERO condition will appear. There will be one desired mode, however, for each of these counters in which the ZERO-ONE-ZERO condition never occurs. Therefore, the mode suppression circuit of the invention may be applied to any of these counters and used to force the counter back to the desired mode should a disturbance accidentally switch the counter into a spurious mode.

Figure 4:
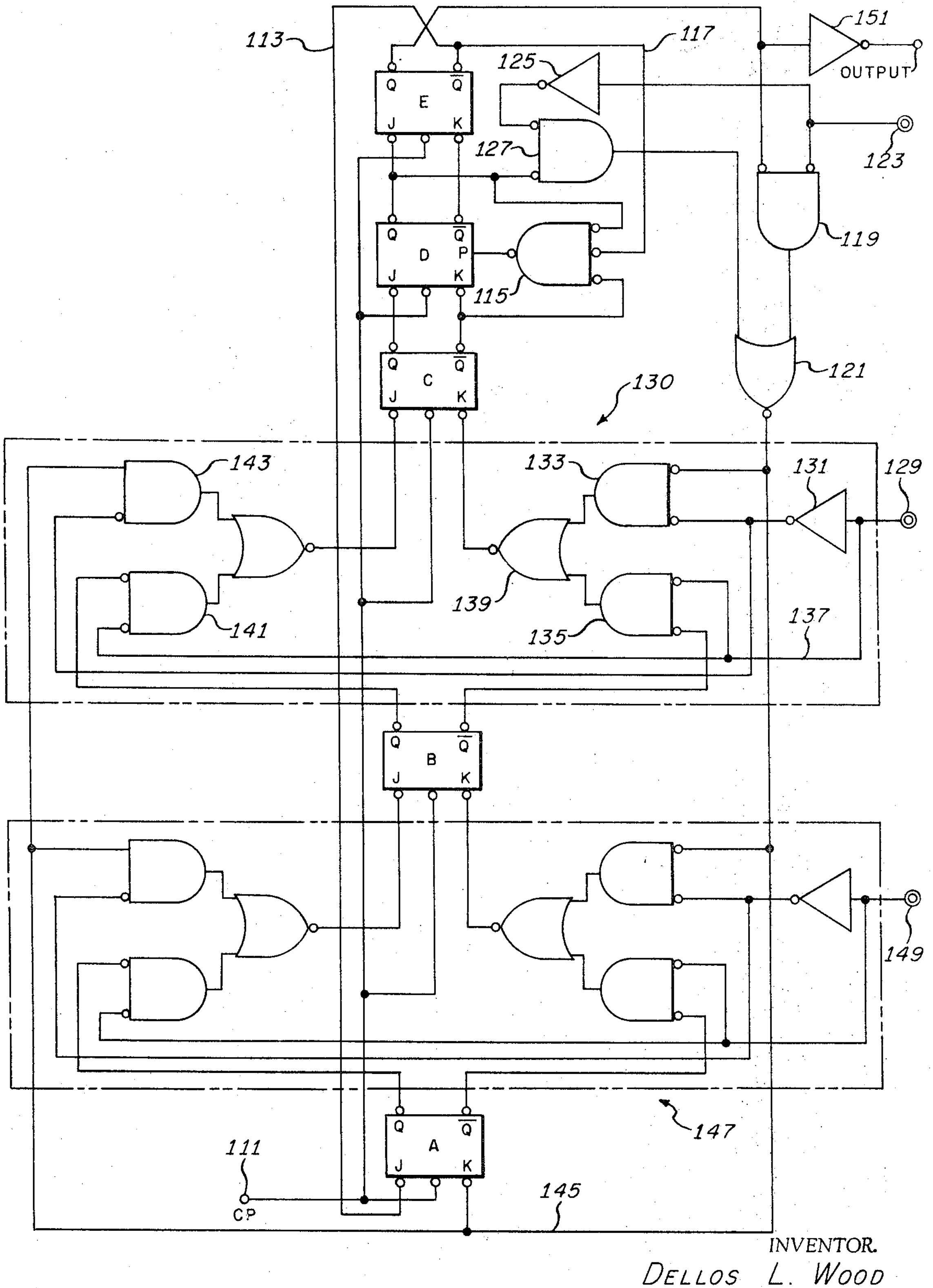
FIG. 4 is a block diagram of a variable modulus shift counter employing the principles of the invention.

Because the mode suppression means of the present invention is applicable to counters of all moduli within the range, a single shift register counter may be built in which a variable modulus can be realized. Such a counter is illustrated in FIG. 4.

In this counter, means are provided for operating with a modulus of 6 or any modulus between 8 and 10, inclusive.

This counter is essentially a 5-stage counter. Clock pulses are applied through a terminal 111 to the clock input terminals on each stage. The binary ZERO output terminal of the most significant stage E is applied back to the appropriate input terminal J of the input stage A. The signal from the same terminal is also applied to the suppression gate 115 through the line 117. The feedback signal from the binary ONE output of the stage E is applied to the input terminal K of the stage A through a feedback control circuit. The feedback current in this circuit passes through gates 119 and 121. A control signal applied to a terminal 123 controls the operation of gate 119. If a low voltage is applied to the terminal 123, the output signal from stage E can pass through the gates 119 and 121.

If a high voltage signal is applied to the terminal 123, however, this signal will pass through an inverter circuit 125 and open a gate 127. The same signal will close the gate 119 so that a feedback signal is now derived from the binary ONE output terminal of the stage D rather than from the stage E. This permits operatoin of the counter in an odd modulo fashion as explained with reference to FIG. 3. A terminal 129 controls the operation of an interstage logic circuit 130 that determines what signals are to be applied to the input of the stage C. If a low voltage is applied to the terminal 129, the inverter 131 applies a signal to the gate 133. Because of the nature of this gate, however, such a signal closes this gate and prevents the feedback signals from the gate 121 being applied to the counter stage C. At the same time, a signal applied to the terminal 129 is applied to a gate 135 through a line 137. This permits the gate 135 to open. An output signal from the binary ZERO output terminal of the stage B can now be applied through the gate 135 and a gate 139 to the K input terminal of the stage C. The same signal applied to the gate 129 also opens a gate 141 and permits a signal from the binary ONE output terminal of stage B to be applied to the J terminal of the stage C.

Similarly, when a high voltage is applied to the terminal 129 so as to permit a feedback signal to be applied through the gate 133, a voltage is also applied to the corresponding gate 143 so as to open this gate. A feedback signal applied to the gate 133 when this gate is open will pass through the gate C when this signal is at a low level. The same feedback signal is applied to the gate 143 through the line 145. However, the line 145 is connected to the gate 143 directly so that a low level signal will not pass through the gate 143. A high level signal applied to the gate 143, however, will be applied to the stage C. Thus, the complement of the feedback signal will be applied through the gate 133 whereas the direct signal is applied to the stage C through the gate 143. A similar interstage logic circuit 147 is interposed between the stage A and the stage B. The performance of the interstage logic circuit 147 is governed by the voltage level applied to the terminal 149. The structure and operation of the interstage logic circuit 147 is identical to that of the interstage circuit interposed between the stages B and C.

In general, the interstage logic circuits determine whether the J–K input signals to a given stage can be received from the next less significant stage or from the feedback stage. A low voltage applied to terminal 129, for instance, closes the gates 133 and 143, so as to block feedback signals from the input to stage C, but opens the gates 135 and 141 so as to couple the output signals from stage B to the input terminals of stage C. A high voltage applied to terminal 129 on the other hand, permits feedback signals to flow to stage C, but decouples stages B and C.

Ordinarily, a first feedback signal is derived from the binary ZERO output terminal of a stage such as stage E, and a second feedback signal is derived from the binary ONE output terminal of that stage.

When stages A and B are decoupled, however, the binary ZERO feedback signal from stage E that is passed through the line 113 is no longer effective. The only feedback signal that is effective is that applied to the interstage logic circuit. This signal is derived entirely from the binary ONE output terminal of the stage D or from the stage E as the case may be. Since the voltage at the two input terminals of a given stage should be complementary functions, however, the effect of both feedback loops is preserved by supplying two gates in the interstage logic such as the gates 133 and 143 and operating these gates in a complementary fashion. Thus, when the circuit is operated so that a feedback signal is applied through the interstage logic circuit to stage C, a high level feedback signal from the gate 121 will pass through the gate 143 to the J input terminal of stage C, but will be blocked in the corresponding gate 133. A low level signal from the gate 121, on the other hand, will cause a signal to be applied to the K input terminal of stage C, but nothing will be applied to the J input terminal of that stage.

The nature of the high and low voltages applied to the terminals 123, 129 and 149 of the modulus selector circuit is determined by the requirements of the circuit components. In a typical application using J–K flip-flops, for instance, a +3 voltage was used for a "high" voltage and a ground-level voltage was used for the "low" voltage.

Any desired modulus within the range of the circuit is uniquely determined by a particular combination of high and low voltages applied to the terminals 123, 129 and 149 of the modulus selector circuit as follows:

| Modulus | Terminal Voltages 123 | 129 | 149 |
|---|---|---|---|
| 6 | Lo | Hi | Hi |
| 8 | Lo | Lo | Hi |
| 9 | Hi | Lo | Lo |
| 10 | Lo | Lo | Lo |

Since each of the moduli within the range of the circuit of FIG. 4 includes a suitable mode in which the ZERO-ONE-ZERO binary condition does not occur and since any other mode of any modulus within this range includes a state in which the ZERO-ONE-ZERO binary condition occurs, the same mode suppression circuit can be used for all of the indicated moduli.

Output signals may be taken from the output amplifier 151 or from individual stages as desired.

Although the mode suppression means has been illustrated as being coupled to the three most significant stages, it may be preferable in some applications to use other stages. In such applications, any three successive stages may be used for this purpose.

While the invention has been described in its preferred embodiments, it is to be understood that the words which have been used are words of description rather than limitation and that changes within the purview of the appended claims may be made without departing from the true scope and spirit of the invention in its broader aspects.

I claim:

1. A shift register counter comprising a plurality of at least three clocked register stages arranged serially in the order of increasing significance; detection means to provide a PRESET signal when three successive counter stages are switched to the ZERO-ONE-ZERO binary condition; and means to switch the intermediate of said three stages to the binary ZERO state in response to a PRESET signal.

2. The apparatus of claim 1 in which said three stages are the three most significant stages and said intermediate stage is the second most significant stage.

3. The counter of claim 2 in which each stage contains binary ONE and binary ZERO output terminals and in which the detection means includes coincidence means coupled to an output terminal of each of the three most significant stages.

4. The counter of claim 3 in which the coincidence means is a gate connected to receive signals from the binary ZERO output terminal of the most significant stage, the binary ONE output terminal of the second most significant stage, and the binary ZERO output terminal of the third most significant stage.

5. The counter of claim 4 in which the second most significant counter stage includes PRESET means coupled to receive a PRESET signal from said gate.

6. A multi-stage shift register counter, comprising a plurality of at least three clocked register stages arranged serially in the order of increasing significance; means to apply counting pulses to the least significant stages of said counter; means to couple external utilization apparatus to the counter; mode suppression means; detection means in said mode suppression means for sensing the ZERO-ONE-ZERO binary condition in the three most significant counter stages; and correction means in said mode suppression means for switching the second most significant stage to the binary ZERO state upon the occurrence of a ZERO-ONE-ZERO binary condition in the three most significant counter stages.

7. The counter of claim 6 in which each stage contains a binary ZERO and a binary ONE output terminal and in which the detection means includes a coincidence gate connected to receive signals from the binary ZERO output of the most significant stage, a signal from the binary ONE output of the second most significant stage, and a signal from the binary ZERO output terminal of the third most significant stage.

8. The counter of claim 7 in which the second most significant stage includes a preset terminal and in which the correction means includes means to couple the output from said coincidence gate to said preset terminal.

9. A shift register counter comprising a plurality of at least four clocked register stages arranged serially in the order of increasing significance; binary ONE and binary ZERO input terminals on each of said stages; binary ONE and binary ZERO output terminals on each of said stages; means to apply counting pulses to each of said counter stages; means to provide a preset signal when the three most significant counter stages are switched to the ZERO-ONE-ZERO binary conditions; means to switch the second most significant counter stage to the binary ZERO state in response to a preset signal; feedback means; means in said feedback means to cross-couple a binary signal from a given counter stage back to a less significant counter stage; means to select said given counter stage from one of the two most significant counter stages; individual interstage logic means interposed between each successive pair of counter stages except said three most significant stages; and means in each of said logic means for alternatively applying either the output of the less significant of the associate pair of counter stages or the feedback signal from said given counter stage to the more significant of the associated pair of counter stages.

References Cited

UNITED STATES PATENTS 3,178,586 4/1965 Rosenfeld ---------- 328—48 X

EUGENE G. BOTZ, Primary Examiner

R. S. DILDINE, Jr., Assistant Examiner

U.S. Cl. X.R.

235—92; 328—46, 48